(12) United States Patent
Wilt et al.

(10) Patent No.: US 11,298,783 B1
(45) Date of Patent: Apr. 12, 2022

(54) METHOD OF MANUFACTURING IMPROVED CROSSBAR CONNECTION FOR IMPLEMENTS

(71) Applicants: Terry Wilt, Chattanooga, TN (US); John Joseph Baker, IV, Chattanooga, TN (US)

(72) Inventors: Terry Wilt, Chattanooga, TN (US); John Joseph Baker, IV, Chattanooga, TN (US)

(73) Assignee: TAG Manufacturing, Inc., Chattanooga, TN (US)

( * ) Notice: Subject to any disclaimer, the term of this patent is extended or adjusted under 35 U.S.C. 154(b) by 110 days.

(21) Appl. No.: 16/137,746

(22) Filed: Sep. 21, 2018

Related U.S. Application Data

(60) Provisional application No. 62/561,735, filed on Sep. 22, 2017.

(51) Int. Cl.
 *B23P 15/00* (2006.01)
 *E02F 3/40* (2006.01)
 *E02F 3/36* (2006.01)

(52) U.S. Cl.
 CPC ............... *B23P 15/00* (2013.01); *E02F 3/40* (2013.01); *E02F 3/3609* (2013.01)

(58) Field of Classification Search
 None
 See application file for complete search history.

(56) References Cited

U.S. PATENT DOCUMENTS

| | | | | |
|---|---|---|---|---|
| 3,070,245 A * | 12/1962 | Schwartz | ................. | E02F 3/36 414/727 |
| 3,934,738 A * | 1/1976 | Arnold | ................. | E02F 3/3627 414/723 |
| 4,381,900 A * | 5/1983 | Schlottman | ........... | B66F 9/0655 414/692 |
| 5,634,735 A * | 6/1997 | Horton | ................. | E02F 3/3613 403/321 |
| 5,727,342 A * | 3/1998 | Horton | ................. | E02F 3/3622 37/468 |
| 6,154,989 A * | 12/2000 | Kaczmarski | .......... | E02F 3/3622 37/444 |
| 6,758,024 B1 * | 7/2004 | Mieger | ..................... | E02F 3/38 52/839 |
| 7,438,494 B1 * | 10/2008 | Da Costa | .............. | E02F 3/3627 37/444 |
| 9,616,464 B1 * | 4/2017 | Currey | ....................... | B07B 1/15 |
| 10,119,242 B1 * | 11/2018 | Faivre | ................. | A01B 59/061 |
| 10,273,650 B1 * | 4/2019 | Villarreal | .............. | E02F 3/3631 |
| 2008/0238064 A1 * | 10/2008 | Springer | ............ | B62D 33/0617 280/756 |
| 2011/0299965 A1 * | 12/2011 | Randall | ............... | B66F 9/07513 414/680 |
| 2012/0177471 A1 * | 7/2012 | Valentini | ................ | E02F 3/306 414/722 |
| 2019/0368156 A1 * | 12/2019 | Faivre | ................. | A01B 59/064 |

* cited by examiner

Primary Examiner — Jacob J Cigna
(74) Attorney, Agent, or Firm — Miller & Martin PLLC; Stephen J. Stark

(57) ABSTRACT

A method of constructing an improved attachment or implement for use with equipment connected to a coupler is provided. The implement has a crossbar which is one of machined, cast or extruded to provide a cross section within at least the connection zone which lacks welds while still providing parallel flats for connecting to a channel in the coupler. The cross section in the connection zone is void-free and seam free.

16 Claims, 10 Drawing Sheets

METHOD OF MANUFACTURING IMPROVED CROSSBAR CONNECTION FOR IMPLEMENTS

CLAIM OF PRIORITY

This application claims the benefit of U.S. Provisional Patent Application No. 62/561,735 filed Sep. 22, 2017, which is incorporated hereby by reference in its entirety.

FIELD OF THE INVENTION

The present invention relates to heavy equipment, such as front end loaders, excavators and the like that use implements, normally secured to the heavy equipment with couplers which receive a crossbar portion within a connection zone to connect the implement to the coupler, and thus the heavy equipment.

BACKGROUND OF THE INVENTION

U.S. Pat. No. 7,866,935, incorporated herein by reference in its entirety, provides a coupler for use with heavy equipment, such as excavators, mini-excavators or other equipment. That device has an adjustment member within the jaws of a C-channel to be able to more securely connect crossbars of implements to the connector. The coupler of the '935 patent has been found to work very well.

However, with roughly 650 implement manufacturers, the tolerances of the crossbars to be received within couplers can still create issues for the users of such equipment. Specifically, the current way of manufacturing the crossbar is to take a section of pipe and weld onto it attachment plates at a top and bottom portion of the pipe in the connection zone. The attachment plates can be machined and then placed on the pipe which necessarily provides an interface between the two, and then the attachment plates are secured to the pipe with a top and bottom weld. The attachment plate is also located spaced from a center line when connected, thereby reducing a length of a potential planar surface. The excess weld material from the top weld is then normally machined or ground off in an effort to have an outer surface of the top attachment plate be parallel to the bottom attachment plate, ideally while maintaining a specific spacing therebetween. The total length of the planar surfaces on these crossbars of these planar portions is less than ¾ inch, if not less than ½ inch, and maintaining spacing and parallel relationships across the planar surfaces has been found to be extremely difficult for manufacturers. There are also voids which occur below the top weld and internal to the bottom weld, which together with the interface of the attachment plate to the pipe provide localized stress points or locations from which brittle failure, stress failure or other failure mechanisms can originate and/or propagate, particularly over time.

Additionally, there are now at least three if not four separate materials in the connection zone of the crossbar: (1) the pipe, (2) the attachment plates, (3) the top weld and (4) the bottom weld. There are also necessarily distinct separations which occur between at least some of these components.

Accordingly, there is believed to be a need for an improved crossbar construction for an implement over these prior art designs which can give rise to more repeatable accuracy in the parallel nature of the surfaces, an increased length of planar connection surfaces, and/or possibly increased strength and/or a reduced likelihood of failure over time due to separation locations and/or voids within the crossbar construction.

SUMMARY OF THE INVENTION

Accordingly, it is an object of many embodiments of the present invention to provide an improved crossbar construction having a uniform cross section at least along the hookup location (connection zone) of a single unitary material that is void-free and/or interface free.

As another object of many embodiments of the present invention to provide an improved crossbar construction utilized with implements having one of an extruded and a cast construction of unitary nature, at least in the connection zone, whereby consistently parallel connection surfaces are integrally formed with the remainder of the crossbar to thereby eliminate separation locations/interfaces and/or voids within at least the connection zone.

Crossbar constructions for an implement, at least in the connection zone, having opposed parallel connection locations that can be longer in planar length than prior art designs, and particularly if made across the entire length of the crossbar instead of only in the connection zone, provide additional strength and resistance to torque over prior art constructions.

Accordingly, in accordance with the present preferred embodiment of the present invention, at least one of a cast or extruded crossbar is provided for an implement to be utilized, normally with a coupler. A more secure connection to prevent rattle or vibration after connection can be provided due to the parallel nature of the surfaces employed possibly in combination with the coupler as shown in U.S. Pat. No. 7,866,935. Not only can the attachment locations be longer than prior art constructions, they can be stronger and be interface-free/void-free to thereby be less susceptible to failure over time.

As described above with the prior art, the attachment plates are welded at a top and bottom location to a pipe with top and bottom welds which in the connection zone and then those welds at least the top welds are ground to attempt to provide planar surfaces. These four welds and then machining step necessarily require a significant amount of labor and expense. By extruding the crossbar, the applicant can maintain a uniform cross section across at least the connection zone, if not the entire implement, thereby not only significantly reducing the cost which has dropped to a savings of possibly over 50% for the crossbar, but also an unexpected increase in strength as verified by finite analysis of the structure over the prior art construction which only had the attachment plates provided in the contact zone, which was difficult enough to attempt to maintain precision of parallelness.

With the extruded crossbar member, the applicant has been able to increase the relative surface contact from roughly half an inch (to at most ¾ inch) at the attachment portions of planar material to at or over an inch, or even an inch and a half or more, which provides a more secure locking connection with the coupler of the prior art constructions as well. Not only can this cross section be provided in the connection zone but can be done across the entire crossbar with the extruded constructions.

Additionally, cast crossbars could be similarly provided to maintain the precision and/or increased repeatable surface area of the crossbars for at least some embodiments, whether having the improved cross section in the connection zone, across the length of the crossbar, or some construction in between.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENT

Figure 1A:
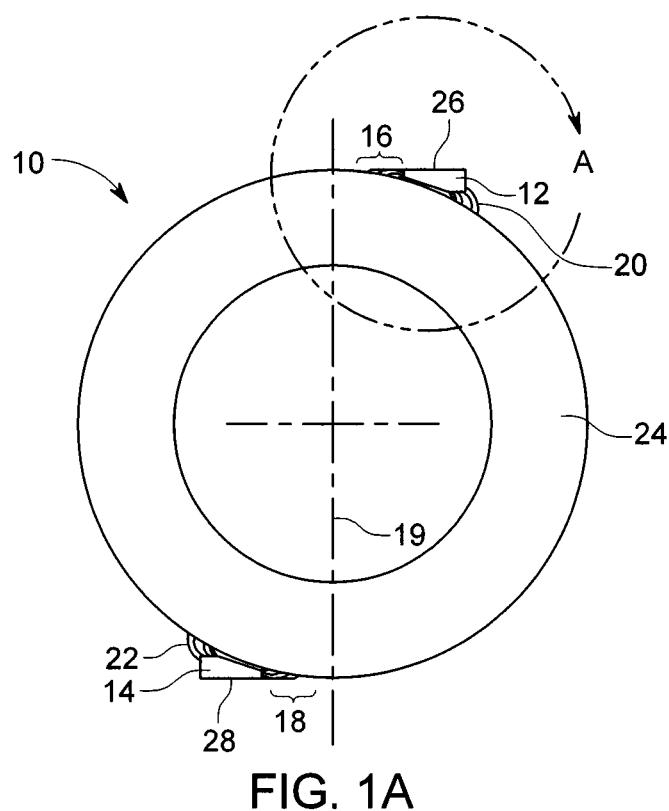
FIG. 1A shows a cross sectional of a prior art crossbar in the connection zone.
Figure 1B:
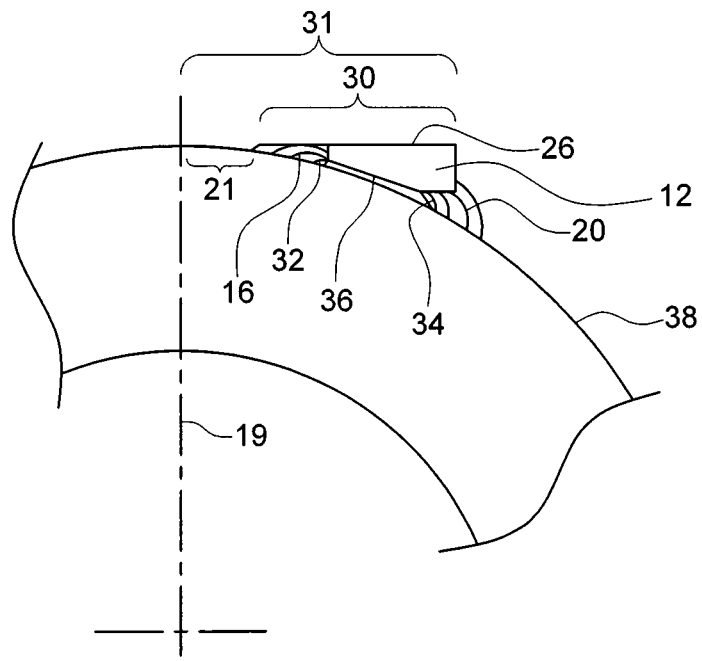
FIG. 1B shows a detail A of FIG. 1A.

FIGS. 1A and 1B show a cross-sectional view of a prior art crossbar 10 with first and second attachment plates 12,14 being connected with top welds 16,18 and bottom welds 20,22 to an exterior surface of a pipe 24. As one of ordinary skill in the art would quickly observe, precisely locating these first and second attachment plates 12,14 relative to the pipe 24 is not only tricky but also maintaining the parallel nature of first exposed surface 26 relative to second exposed surface 28 is extremely difficult.

The attachment plates 12,14 are spaced from the center line 19 when connected. This normally creates a gap 21 which is a loss of potential planar load bearing surface.

After performing the top and bottom welds 16,18,20,22 respectively, a machining or grinding step is typically performed whereby at least the top weld 16,18 is ground down to be planar with the exposed connection surface 26 to provide first connection plane 30 which would then have a corresponding portion at the bottom portion of pipe 24 as would be understood by those of ordinary skill in the art. It is extremely difficult to maintain the parallel nature of the surfaces. Additionally, when manufacturing these surfaces, there is almost always at least one of a first void 32 in front of at least a portion of the attachment plate 26 and a second void 34 below the connection surface 30 or connection plate 26 as shown. Additional there is also an interface 36 in which the attachment plate 26 contacts an exterior surface 38 of the pipe 24. It is worthwhile to mention that the attachment plate 26, the pipe 24 and the welds 16,18 are all different materials having different characteristics, such as a 50 Min Yield pipe 24, a 70 or 80 Min Yield weld material and an A36 (36 Min Yield) attachment plate 26. The pipe 24 is rarely ground, if ever, in these procedures.

Any of the voids 32,34 and/or the interface 36 can be a location for stress to propagate as cracks and ultimately failure of either or both of the top and bottom welds 16, 20 particularly over time.

Additionally, all of the welding steps for creating the top welds 16,18 as well as the bottom welds 20,22 take an extensive amount of time and labor as well as the machining step(s) in order to attempt to provide the upper and lower connection surface(s) 30. In many instances, the length 30 of the planar surface of the connection surface 30 is typically a half-inch or less due to the difficulty in providing precision, but certainly not more than three quarters of an inch as represented by length 31 from the center line 19 to an end of the attachment plate 12, and normally limited to a length of connection surface 30 (since the surface along or at the gap 25 is normally not machined).

Figure 2:
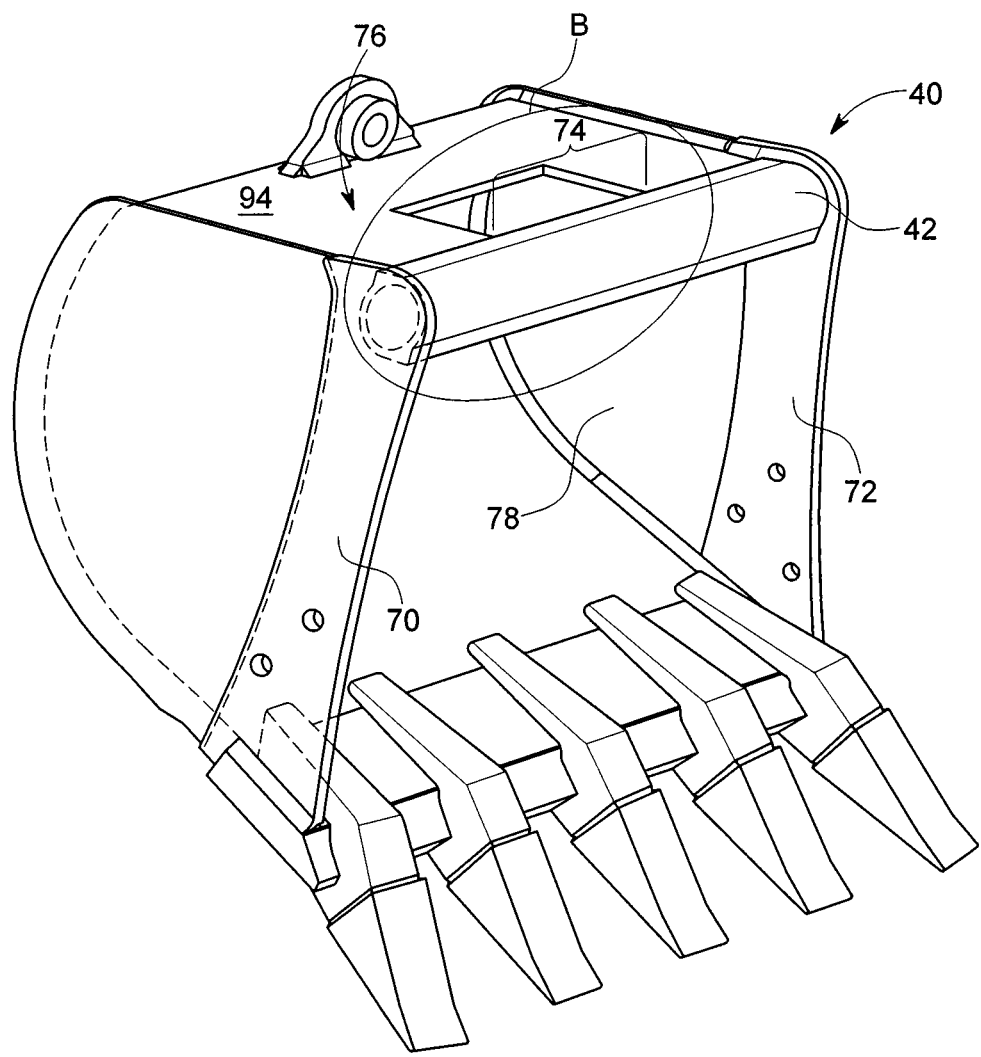
FIG. 2 is a rear perspective view of the presently preferred embodiment of the present invention.
Figure 3:
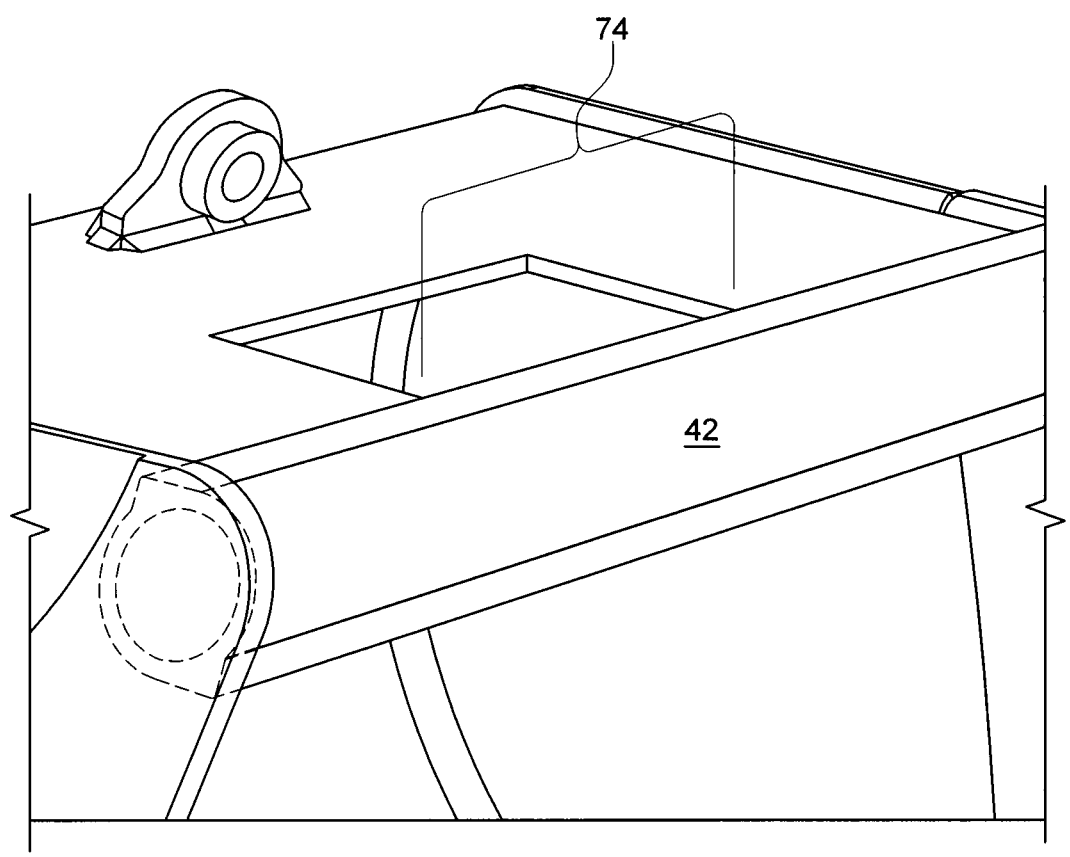
FIG. 3 is a detailed close up view of detail B of FIG. 2.
Figure 4:
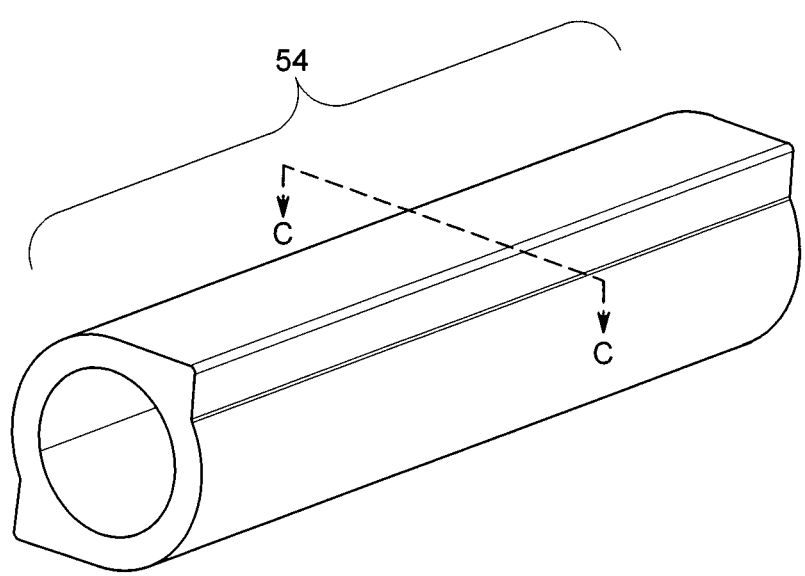
FIG. 4 is a front perspective view of the crossbar shown in FIGS. 2 and 3.
Figure 6:
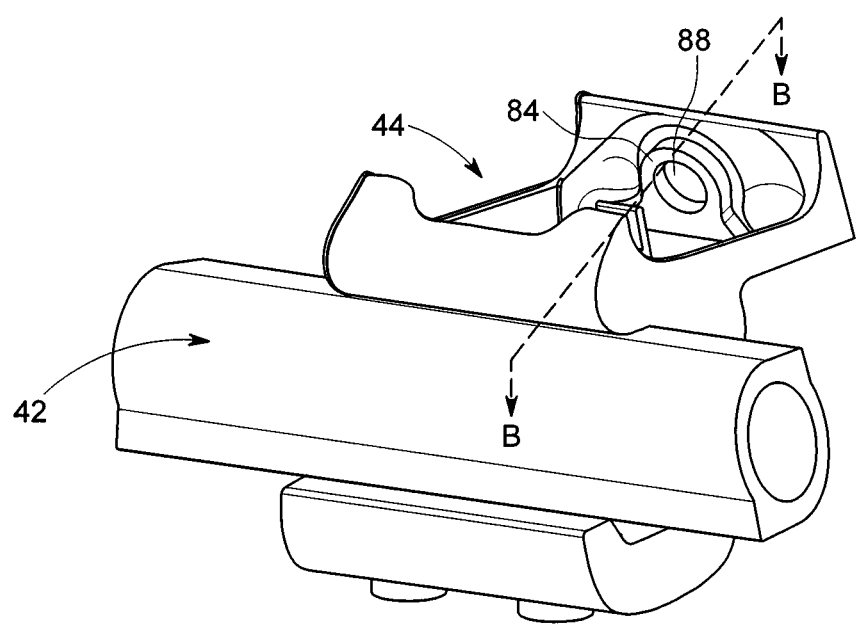
FIG. 6 is a rear perspective view of a coupler connected to the crossbar as shown in FIGS. 2-5 with a crossbar taken out of the attachment.
Figure 7:
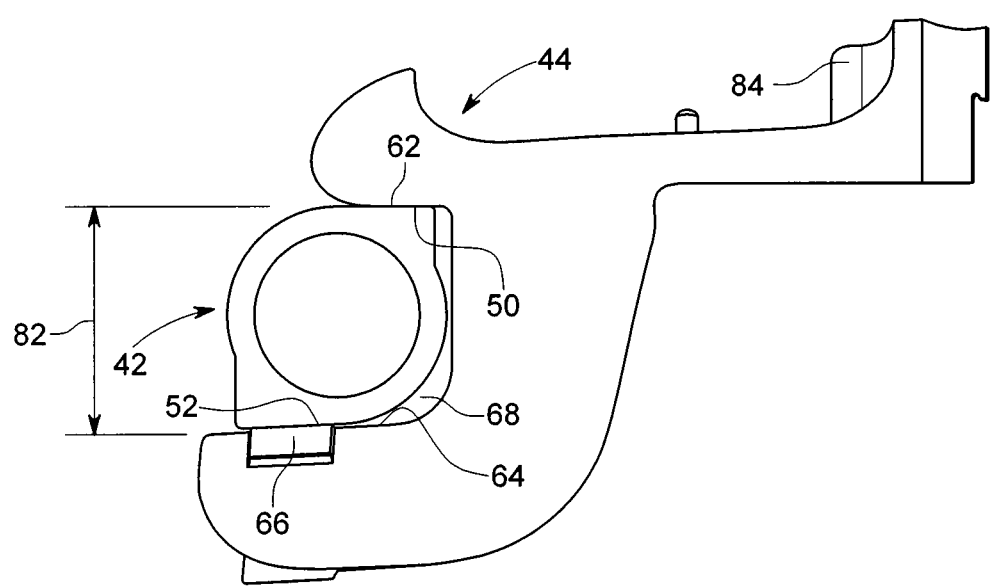
FIG. 7 is a cross sectional view of the structure shown in FIG. 6 taken along the line D-D.

FIG. 2 shows the first embodiment of a presently preferred embodiment of an attachment 40 in the form of a bucket having a crossbar 42 which typically cooperates with a coupler 44 as shown in FIGS. 6 and 7 as will be explained in further detail below. The crossbar 42 may be extruded, cast, or otherwise provided, for many embodiments.

Figure 5:
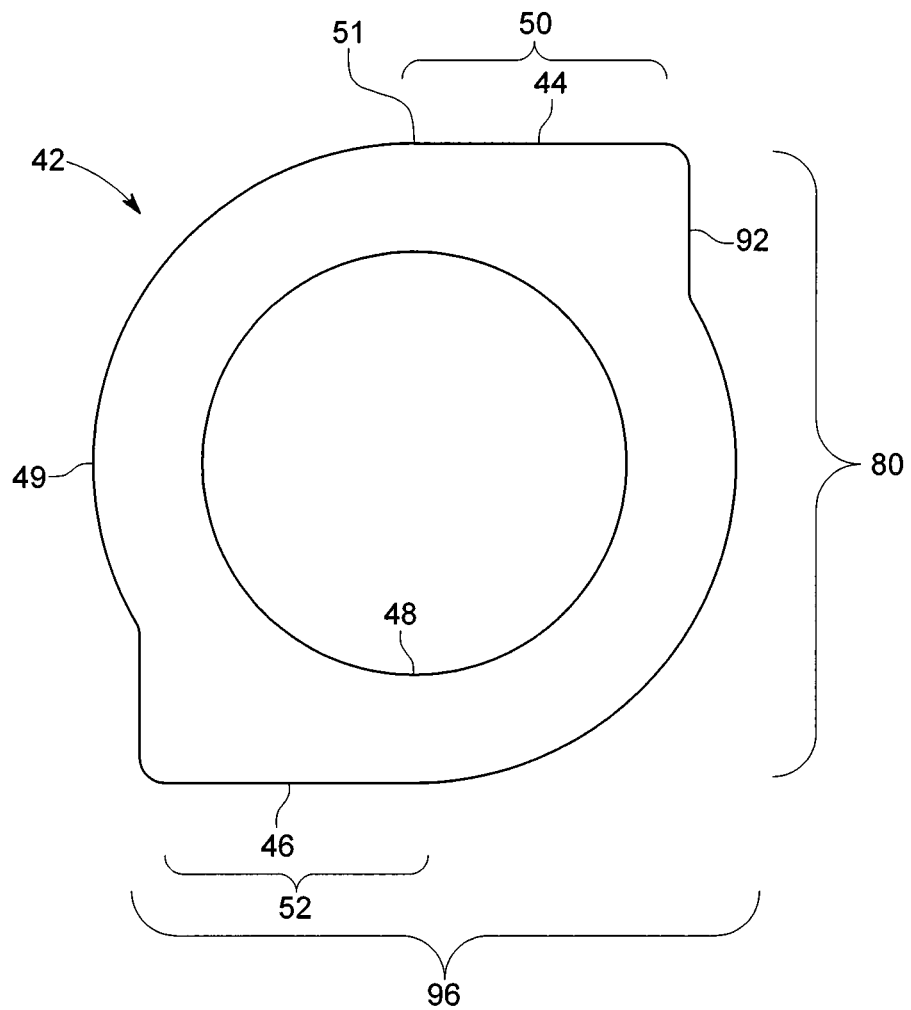
FIG. 5 is a cross sectional view taken along line C-C of FIG. 4.

The crossbar 42 for many preferred embodiments has at least a relatively consistent cross section such as the one shown in FIG. 5 across its length, such as its entire length for at least some embodiments. Other embodiments may be manufactured differently to have different cross sections along a first portion of its length, such as the embodiment shown in FIG. 8, which will be discussed in further detail below. Unlike most pipes, the outer diameter is desired to be within relatively strict tolerances as opposed to the inner diameter which most pipe manufacturers strive to maintain.

The crossbar 42 of FIG. 2 as illustrated has been extruded or cast. It has absolutely no voids, interfaces or separations between the attachment connection or planar portion (i.e, the first and second flats 44,46) and the interior surface 48 of the crossbar 42 at least in the connection zone 74 as explained below. The cross section of the crossbar 42 could be said to have a unitary or integral construction at least in the connection zone 72. Accordingly, the first and second voids 32,34 shown in FIG. 1B are not present in this construction. For many embodiments, this is due to the ability to either cast or extrude the crossbar 42. One could also machine the crossbar 42 from a larger diameter and thickness of pipe. There are also no interfaces 36 of connecting materials for which a fracture seam may initially already be present as provided by the prior art. A seam free and void free connection of the first and second flats 44,46 into the crossbar 42 all the way to the interior surface 48 is believed to provide a more robust crossbar 42, while also significantly reducing costs over prior art construction techniques.

A finite analysis comparing the crossbar 42 to the crossbar 10 of FIG. 1A showed a dramatic increase in strength as and resistance to torsion along the length 54. Furthermore, the first contact plane 50 and the second contact plane 52 are found to be able to be consistently manufactured to be at least an inch if not an inch and a half or more as opposed to the half-inch and certainly not more than three quarters of an inch of the prior art construction due to the difficultly in manufacturing with that technique.

While this may not initially sound that significant, when referring to FIG. 7, one will see that the first contact surface 50 is shown adjacent an upper wall 62 as well as a lower mouth portion 64 against the second planar face attachment face 52 whether or not it has the adjustable cinching capability 66 as discussed in U.S. Pat. No. 7,866,935 or not. As one can see that these longer contact faces 50,52 extending from center line 51 provide for a longer snugger contact surface 50,52 and tighter fit within the coupler 44 which previously has not been achieved in the prior art. In fact, contact faces 50,52 can extend across the other or opposite side of center line 51 (something that has not happened with prior art constructions as they are currently manufactured) See FIG. 10. For many embodiments, there is no gap 21 between the attachment surfaces 50,52 and the center line along those planar surfaces. The surface contact area provided by the first and second contact planes is more than double the prior art for many embodiments, but at least 33% greater. This can reduce rattle for at least many embodiments.

In order to make the connection of FIG. 7, normally the crossbar 42 as shown in FIG. 7 is rotated towards the right so that the first contact face 50 is angled at least partially downwardly thereby permitting more of a round cross section portion as opposed to the planar flats 50,52 being introduced into the channel 68 which can then effectively be rotated to provide a bite and/or mechanical bind nature as is shown particularly with the use of the adjustment 66 (of U.S. Pat. No. 7,866,395, if used) to help secure that connection in a tight and non-rattling manner.

In the prior art, the more non-planar the first attachment plate was from the second attachment plate the less contact surface occurred between the attachment plates and the side channel walls, and thus more rattle and play which is believed to be undesirable to operators and/or others. This rattle can be significantly reduced, and many times eliminated completely with the applicant's construction.

Figure 8:
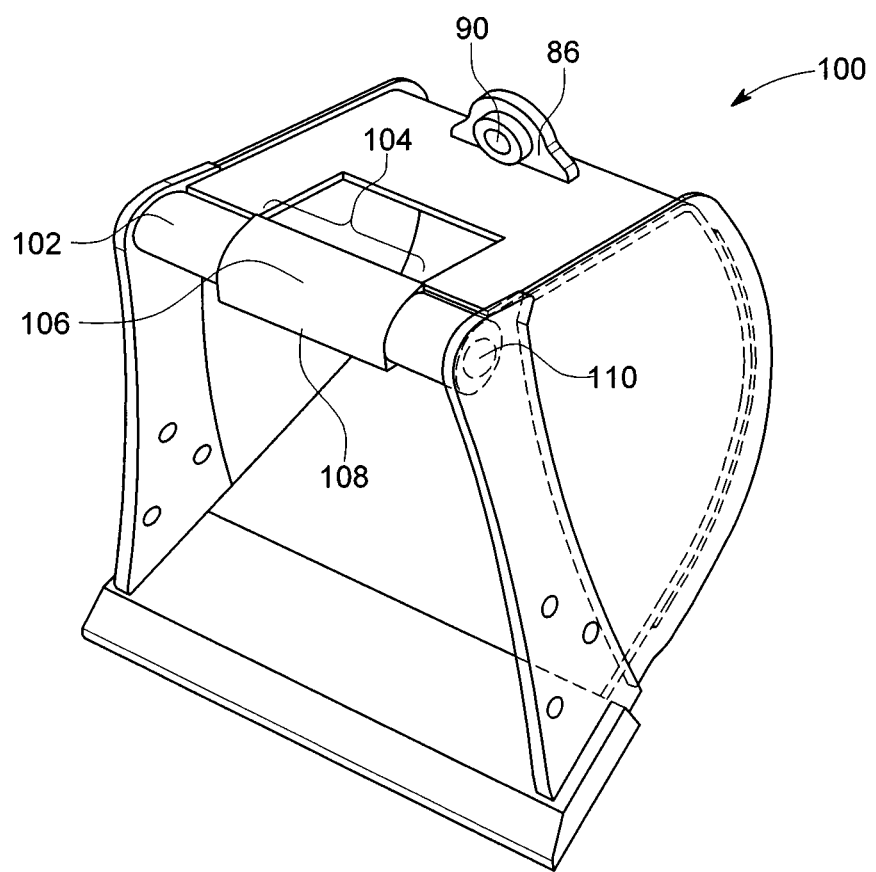
FIG. 8 is a rear perspective view of a first alternative embodiment of the present invention.

In the manufacture of a bucket as an attachment 40 certainly crossbar 42 can extend from first side 70 to second side 72. However, for other embodiments, it may only be necessary for the improved cross section of the crossbar 42 to be in the connection zone 74, or a portion thereof, such as where the coupler 45 connects to the crossbar 42 as would be understood by those of ordinary skill in the art, and there could be additional structures to support the crossbar 42 outside of the connection zone 74 for various embodiments. One such possibility is shown in FIG. 8 which is discussed in further detail below. Certainly, other implements or attachments 40 can connect with a similar or dissimilar coupler 55 other than the bucket embodiment illustrated.

The crossbar 42 is shown also extending at a top 76 of the attachment 40 and therefore assisting in defining the opening 78 into which the material can enter the attachment 40 when provided as a bucket as would be understood by those of ordinary skill in the art. While the coupler 45 may provide an adjustment mechanism 66, not all couplers 45 will have such a capability. The new precision of being able to provide for the height 80 and know the parallel nature of the flats 44,46 with a high degree of accuracy, as compared to the width 82 of the channel 68 of the coupler, 45, the ability to insert the crossbar 42 into the coupler 44 as would be understood by those ordinarily skilled in the art as described above with the round surfaces 49 of the crossbar 42 first directed into the channel 68 and then rotated to mechanically bind with the flats 44,46 is drastically improved. While the crossbar 42 is shown as having a principally round surface 49 apart from the flats 44,46, other embodiments could take on other shapes.

With the crossbar 42 received in the channel 68 of the coupler 44 as shown in FIG. 6, the bottom 84 is above the receiver 86 to then be able to insert a pin through first and second bores 88, 90 to then secure the attachment 40 to the coupler 44.

For some embodiments, the crossbar 42 has a stop 92 which can connect to back 94 of an attachment 40, such as a bucket outside of the connection zone 74. This can provide for more precise location of the first flat 44 within the connection zone 74 than prior art techniques as well, if not a more rigid attachment 40, and thus possibly a stronger attachment 40.

Some embodiments provide a 4.5-inch diameter for a crossbar width 96, which may be slightly shorter than height 80. Other embodiments provide a 2.88-inch diameter, but other embodiments could use still other dimensions.

FIG. 8 shows a first alternatively preferred embodiment of an attachment 100 having a crossbar 102 with this attachment 100 having the cross section shown in FIG. 5 in the connection zone 104, but possibly a more pipe-like cross section (i.e., more round) outside of the connection zone 104 for zones 112,114. This construction could be made by casting the crossbar 102 or other methodology. Once again there are no voids separating the first and second attachment planes 106,108 from internal surfaces 110 of the crossbar 102 as exists in the prior art construction and certainly there is no interface contact between an adjustment plate and a pipe thereby giving a location for a potential stress fracture possibly with void(s), since the attachment planes are integrally formed into the crossbar 102 in a similar manner as the crossbar 42 in the connection zone. No party is known to have cast a crossbar 102 as shown and described herein.

Figure 9:
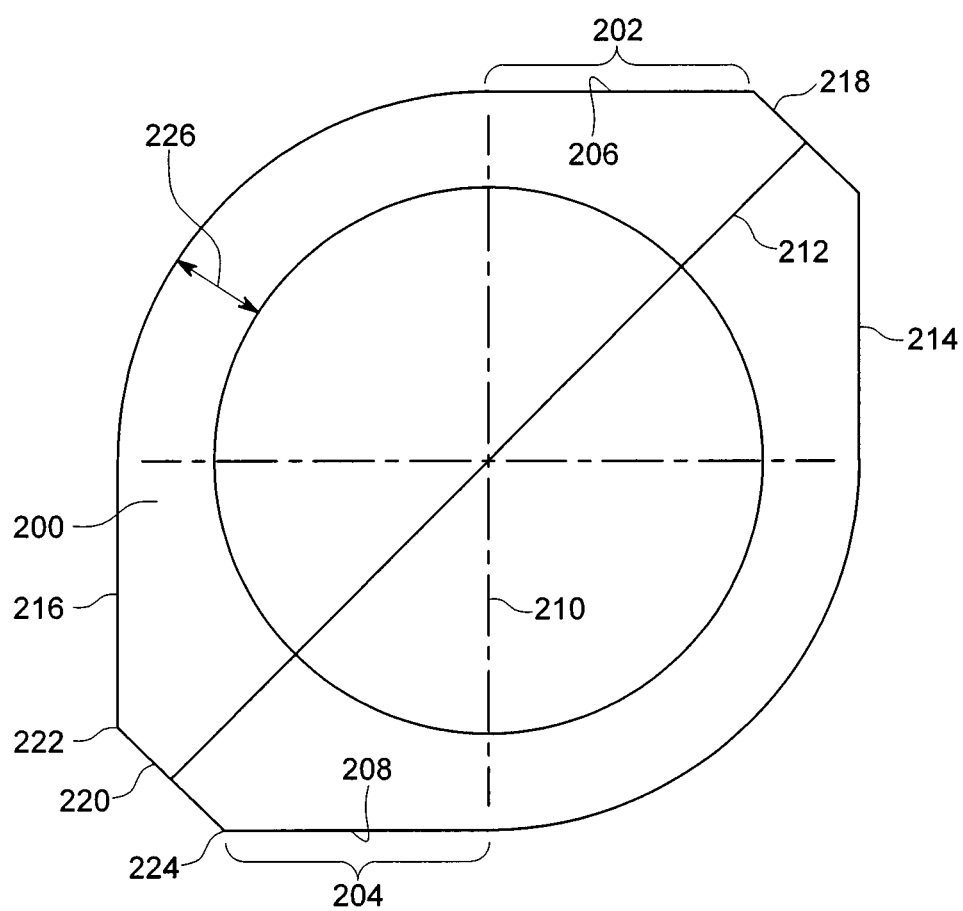
FIG. 9 is a cross sectional view such as could be taken along the line C-C of FIG. 4 of a second alternative preferred embodiment.

FIG. 9 provides a cross section of a second alternatively preferred embodiment showing a crossbar 200 having attachment surfaces 202,204 with respective flats 206,208 extending preferably to the centerline 210. This embodiment may be extruded or cast. This design can be symmetrical about axis 212 for some embodiments. Stops 214,216 can be similar or different in shape as attachment surfaces 202,204. Ends 218,220 may be rounded, pointed, flats or have other shapes. When flats are provided at ends, 218,220, corners 222,224 may be rounded or not. Wall thickness 226 may vary or be relatively consistent for various embodiments (other than at flats 206,208 and/or stop 214,216).

Figure 10:
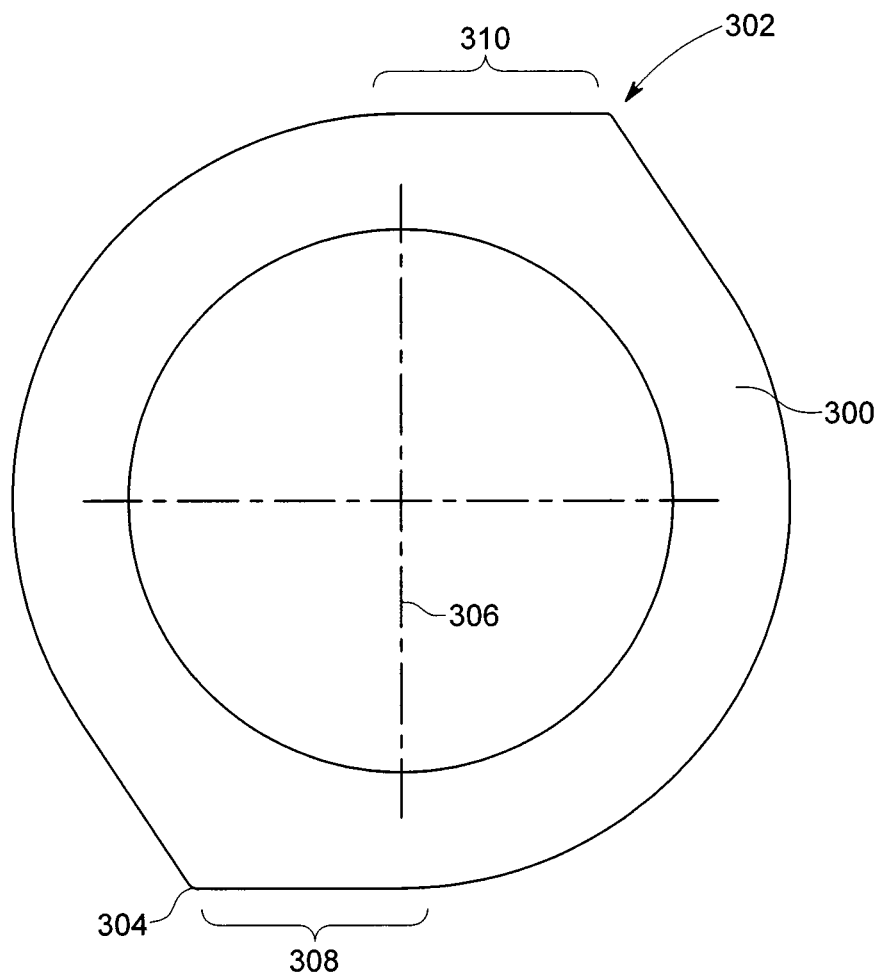
FIG. 10 is a cross section view such as could be taken along the line C-C of FIG. 4 of a third alternative preferred embodiment.

FIG. 10 shows a cross section similar to FIG. 9 except ends 302,304 of crossbar 300 are rounded points and other minor differences. For instance, flats 300,310 extend to the opposite side of center line 306. Other embodiments could be constructed differently.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A method of manufacturing an implement with an improved crossbar connection comprising the steps of:
   a) extruding a crossbar independently of welding to provide a void-free and seam free cross section at least in a connection zone internal to an attachment portion having parallel flats, said flats spaced apart about a circular exterior surface of the crossbar;
   b) connecting said crossbar securely to an implement whereby said parallel flats cooperate with a channel of a coupler whereby when the implement is connected to the coupler, the flats contact against opposing sides of the channel in a connected configuration, and one of said flats and coupler rotated relative to the other whereby the flats are out of connection with the sides of channel through rotation to thereby permit disengagement of the coupler from the crossbar.

2. The method of claim 1 wherein the crossbar is void-free and seam free from the parallel flats to an interior surfaces of the crossbar.

3. The method of claim 1 wherein the implement is a bucket.

4. The method of claim 1 wherein the crossbar is symmetrical along its cross-section.

5. The method of claim 1 wherein the flats extend parallel to the exterior surface of the crossbar at the centerline.

6. The method of claim 1 wherein the flats terminate at an end and the crossbar extends at least perpendicularly from the flat at the end to the circular exterior surface.

7. The method of claim 1 wherein the planar flats extend outwardly from a centerline of the crossbar.

8. The method of claim 7 wherein the planar flats extend from a tangent of the circular exterior surface of the crossbar.

9. The method of claim 1 wherein the planar flats provide at least an inch of planar surface.

10. The method of claim 9 wherein the planar flats provide at least an inch and a half of planar surface.

11. The method of claim 1 where the flats are connected to stops, said stops extending perpendicularly to the flats, and the stops connect at tangents to the circular exterior surface of the crossbar.

12. The method of claim 11 wherein corners span between the flats and stops, said corners having a planar exterior surface spanning an adjacent flat and stop.

13. The method of claim 1 wherein the crossbar extends from a first side to a second side of the implement.

14. The method of claim 13 wherein the connection zone is located internal to a length of the crossbar.

15. The method of claim 14 wherein the connection zone is shorter than the length the crossbar.

16. A method of manufacturing an implement with an improved crossbar connection comprising the steps of:
   a) extruding a crossbar independently of welding to provide a void-free and seam free cross section at least in a connection zone internal to an attachment portion having parallel flats, said flats spaced apart about a curved exterior surface portions of the crossbar;
   b) connecting said crossbar securely to an implement whereby said parallel flats cooperate with a channel of a coupler whereby when the implement is connected to the coupler, the flats contact against opposing sides of the channel in a connected configuration, and one of said flats and coupler rotated relative to the other whereby the flats are out of connection with the sides of channel through rotation to thereby permit disengagement of the coupler from the crossbar.

\* \* \* \* \*